United States Patent [19]

Koelsch

[11] Patent Number: 4,549,962
[45] Date of Patent: Oct. 29, 1985

[54] ROTATING BIOLOGICAL CONTACTOR

[75] Inventor: Lester M. Koelsch, Pewaukee, Wis.

[73] Assignee: Envirex Inc., Waukesha, Wis.

[21] Appl. No.: 632,358

[22] Filed: Jul. 19, 1984

[51] Int. Cl.$^4$ .................................................. C02F 3/08
[52] U.S. Cl. .................................... 210/150; 210/232; 261/92
[58] Field of Search ............... 210/150, 151, 619, 232; 261/92

[56] References Cited

U.S. PATENT DOCUMENTS

| | | | |
|---|---|---|---|
| 3,827,559 | 8/1974 | Gass et al. | 261/92 |
| 3,837,492 | 9/1974 | Di Bello | 210/150 |
| 4,137,152 | 1/1979 | Sako et al. | 210/150 |
| 4,399,031 | 8/1983 | Imano et al. | 261/92 |
| 4,444,658 | 4/1984 | Hankes et al. | 210/150 |

FOREIGN PATENT DOCUMENTS

| | | | |
|---|---|---|---|
| 52-77447 | 6/1977 | Japan | 210/619 |
| 53-82054 | 7/1978 | Japan | 210/619 |

Primary Examiner—Benoit Castel
Attorney, Agent, or Firm—Lawrence J. Crain

[57] ABSTRACT

A rotating biological contactor is formed about a polygonal shaft. The contactor includes a hub formed of a series of hub rings disposed side by side along the length of the shaft with each hub ring formed of hub segments which are joined end to end. In one embodiment the hub segments are identical and there is one hub segment for each corner of the polygonal shaft. In a second embodiment there is one hub segment for each two corners. The hub segments also include a mounting portion which has welded to it alternating flat and formed thin walled sectors of contactor media. The sectors are joined to each by welding and successive layers of the sectors are angularly offset from each other so that some of the sectors span the joints between adjacent hub segments of a hub ring.

7 Claims, 8 Drawing Figures

ROTATING BIOLOGICAL CONTACTOR

BACKGROUND OF THE INVENTION

This invention relates to the biological treatment of wastewater, and more particularly to an improved form of rotating biological contactor.

Rotating biological contactors are used in secondary biological wastewater treatment processes. The contactors provide surfaces for the growth of a biomass which has the ability to absorb, adsorb, coagulate and oxidize undesirable organic constituents of the wastewater and to change them into unobjectionable forms of matter. The contactors are typically rotated partially submerged in wastewater in a treatment tank so that the surfaces are alternately exposed to the wastewater and to oxygen in the overlying atmosphere. A film of wastewater is carried into the air and trickles down the surfaces of the contactor while absorbing oxygen from the air. Organisms in the biomass remove dissolved oxygen and organic materials from the film of wastewater and unused dissolved oxygen in the wastewater film is mixed with the contents of the mixed liquor in the tank.

Initially the rotating biological contactors were simple flat discs spaced along a support shaft. Originally formed of sheet metal, the flat discs have more recently been formed of a foam plastic material (see British Pat. No. 935,162 to Hartmann, published Aug. 28, 1963). Discs offer a limited surface area in relation to the volume which they occupy, and other approaches have been employed to increase the surface area in relation to the volume of the envelope of the contactor. One approach has been to build up the contactor from sheets of thermoformed plastic which are joined together along the length of the axis of the shaft and define a series of passageways through which the wastewater flows (see U.S. Pat. No. 3,827,559 issued Aug. 6, 1974 to Gass, et al.) The passageways define large surface areas which are contacted by the wastewater and support the growth of the biomass. Another approach is to wind a formed sheet of thermoplastic in a spiral about a central shaft. The formed sheet can be provided with a series of cups or other protuberances which hold the layers of the convolute apart and also increase the surface area (see U.S. Pat. No. 4,115,268, issued Sept. 19, 1978 to Thissen).

The contactor is subjected to considerable load. Although the biomass is relatively thin on any surface (typically 1 to 4 mm thick), in the aggregate the weight of the biomass is considerable and particularly when it is saturated with a wastewater as it must be in order to function properly. The drag through the water as the contactor is rotated is a further source of loading. Finally, there may be some buoyant force particularly when a foamed disc contactor is employed. In an effort to overcome the loading problems to which the contactors are subjected, metal frameworks have been used. A framework typically includes radial struts eminating from the shaft and connected adjacent their outer ends by generally tangential bars. The framework also includes tie rods that extend the length of the contactor parallel with the axis of the shaft and connected to the radial struts. The purpose is to better transmit the load on the contactor to the shaft and the torque of the shaft to the contactor. These metal frameworks must be specially coated or formed of stainless steel in order to resist the very corrosive environment in which the contactor will operate.

Where a supporting framework is not employed, stress failures can occur particularly in the area where the contactor material is joined to the shaft.

The present invention provides a rotating biological contactor construction which does away with the need for a supporting framework while providing a strong contactor structure and an excellent joining of the contactor to the supporting shaft.

SUMMARY OF THE INVENTION

A rotating biological contactor in accordance with the invention is formed of a series of hub segments joined together end to end to form a ring adapted to surround a polygonal shaft. The hub segments each have an inner profile which complements the contour of the polygonal shaft and a mounting portion which extends radially outwardly of the hub ring. Contactor media are joined to the mounting portions of the hub segments around the perimeter of the hub ring.

Further in accordance with the invention, a plurality of the hub rings are disposed side by side along the length of the shaft and the media of adjacent rings are joined to each other.

In the preferred forms of the invention, the hub segments each include a first joint portion at one end which has a plurality of openings and a second joint portion at the opposite end which has a plurality of posts to be received in the openings of a peripherally adjacent hub segment. The hub segments each also include register means on each side such that the register means of one hub segment will mate with the register means of the longitudinally adjacent hub segments. The contactor media includes thin walled flat and formed sheets which together define a series of interior passageways through which wastewater will pass. The sheets of the contactor media and the hub segments may each be formed of a thermoplastic resin material with the sheets and hub segments joined together and to each other by welding.

In one preferred form of the invention, the hub segments are identical and the inner profile of each complements one corner of the polygonal shaft. In another preferred form, each segment complements two corners of the shaft.

It is a principal object of the invention to provide a self-supporting rotating biological contactor media which can be joined to a large central shaft.

It is a further object of the invention to provide such a rotating biological contactor media which can be fabricated into large sections in a factory and then joined together about the shaft at the point of use.

It is another object of the invention to provide a rotating biological contactor which employs hub segments of relatively heavy cross section joined integrally with each other end to end and along the length of the shaft and joined integrally to a series of radially extending thin wall sheets which are joined together to form interior passages having surfaces for the growth of a biomass.

The foregoing and other objects and advantages of the invention will appear in the following detailed description of the preferred embodiments. In the description reference is made to the accompanying drawings which illustrate the preferred embodiments of the invention.

DETAILED DESCRIPTION OF THE PREFERRED EMBODIMENT

Figure 1:
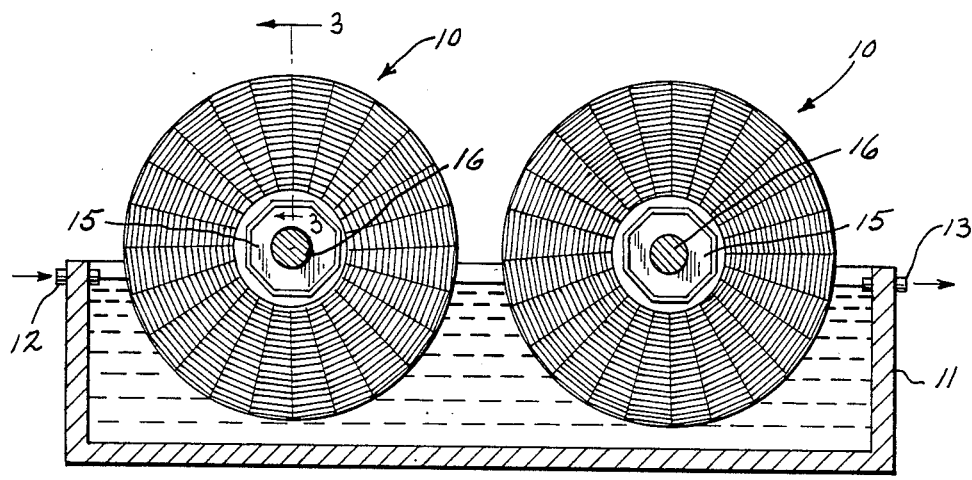
FIG. 1 is a front view in elevation of a pair of contactors in accordance with the invention mounted in a treatment tank.

Referring to FIG. 1, a pair of rotating contactors represented generally by the numeral 10 are shown mounted partially submerged in the wastewater held in a treatment tank 11 having an inlet 12 and an outlet 13. The contactors 10 are supported on central shafts 15 which are polygonal in cross section and which have a small diameter circular stub shaft 16 at each end. The stub shafts 16 are mounted in bearings (not shown) supported on the top edges of the side walls of the treatment tank 11.

Figure 4:
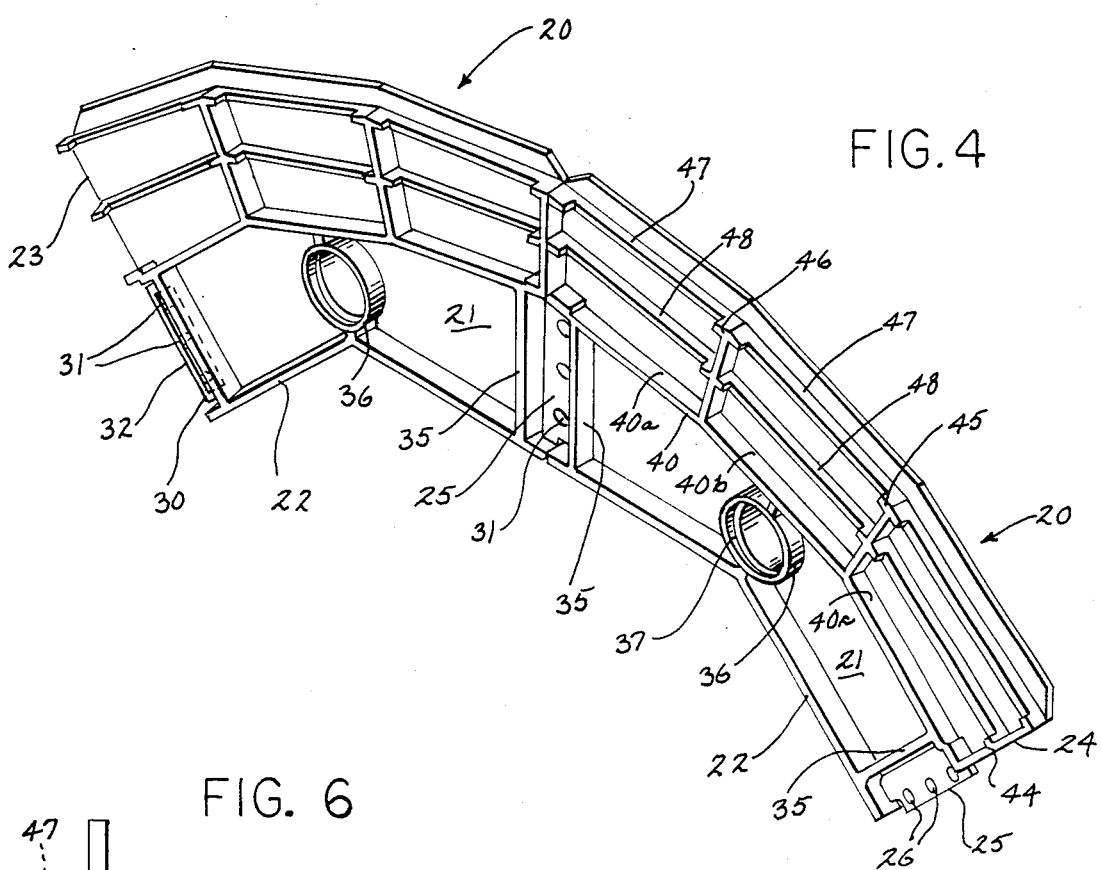
FIG. 4 is a view in perspective of a pair of identical hub segments of the embodiment of FIGS. 1-3 shown joined together end to end.
Figure 6:
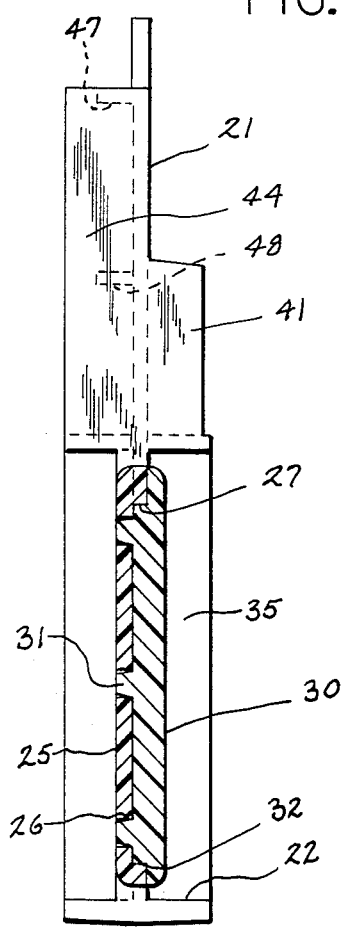
FIG. 6 is a view in section taken through the overlapping and joined portions of a pair of hub segments and taken in the plane of the line 6—6 of FIG. 4.
Figure 5:
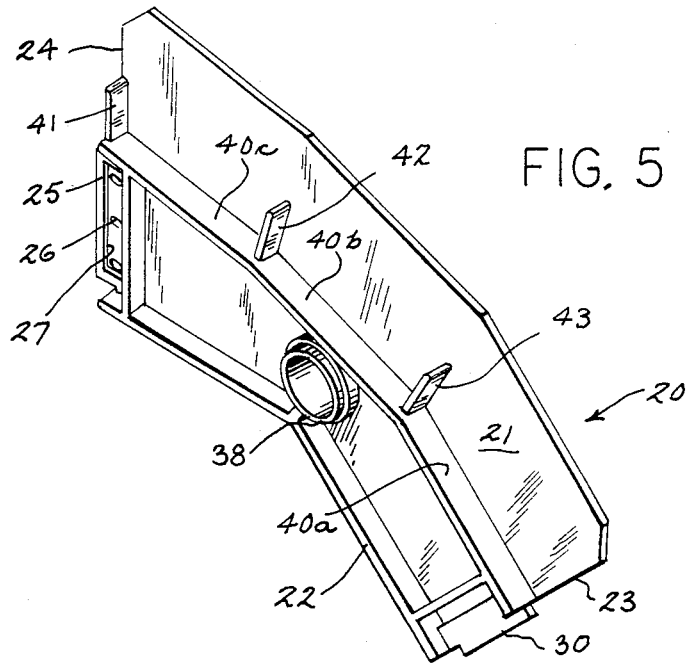
FIG. 5 is a view in perspective of a hub segment showing the side opposite to that illustrated in FIG. 4.

In the preferred embodiments the polygonal shaft 15 is a hollow, tubular octagon. The shaft 15 is surrounded by a series of eight identical hub sectors 20; one for each of the apexes or corners of the shaft 15. Each of the hub segments 20 includes a flat medial wall 21 which extends outwardly from an inner flange 22 in a plane normal to the axis of the shaft 15. The inner flange 22 is formed with an angle which corresponds to the excluded angle of the octagon shaped shaft 15 so that the flange has an inner profile which complements one corner of the shaft 15. The inner flange projects to both sides of the medial wall 21. The left and right edges 23 and 24, respectively, of the segments extend generally along lines perpendicular to the inner flange 22 at positions which correspond to the mid points of the sides of the shaft 15. The right end of each segment, as viewed in FIG. 4, has a first joint portion 25 which has a plurality of holes or openings 26 aligned along the right edge 24 of the segment. The backside of the first joint portion 25 has a rectangular recess 27 which circumscribes an area surrounding the three openings 26. The opposite left end of each hub segment has a cooperating second joint portion 30 which has three projecting tapered posts 31 which are also aligned along the respective left edge 23 of the segment. The posts 31 extend from a raised rectangular platform 32 which is shaped to be nestled into the rectangular recess 27 on the backside of the first joint portion 25 of an adjacent hub segment. In that position, the tapered posts 31 are received within the openings 26. Hub segments 20 are thereby joined into a ring about the shaft 15, with the posts 31 of each segment being received in the openings 26 of an adjacent segment.

The hub segments 20 are preferably formed by injection molding a high density polyethylene or other thermoplastic resin. The posts 31 are then bonded into the openings 26 of an adjacent segment by ultrasonic welding. Alternately, the posts 31 may be replaced by openings which would be aligned with the openings 26 of an adjacent hub segment and a rivet or other fastener would extend through the aligned openings and join the hub segments.

Figure 3:
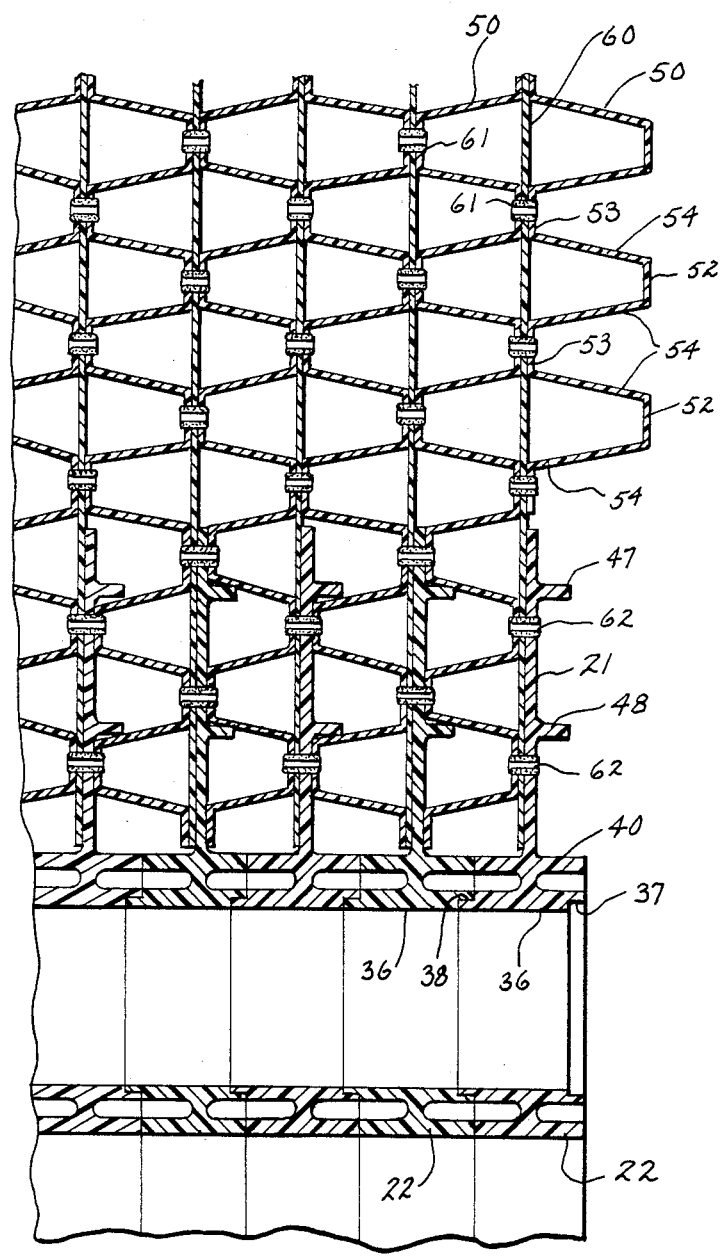
FIG. 3 is a view in vertical section through the contactor and taken in the plane of the line 3—3 of FIG. 1.

End walls 35 extend perpendicularly to the lower flange 22 inboard of each of the first and second joint portions 25 and 30 and extend to both sides of the medial wall 21. A circular cylindrical boss 36 is formed in each hub segment 20 at the apex of the lower flange 22. As shown in FIG. 3, the boss 36 has a short counterbore 37 formed at one end and a mating flange 38 of reduced diameter extending outwardly of the other end of the boss 36. The flange 38 of the boss 36 of one segment 20 is received within the counterbore 37 of the adjacent hub segment. In this manner, the hub segments of adjacent hub rings will register with each other.

Each hub segment 20 further includes an intermediate flange 40 which extends to both sides of the medial wall 21. The intermediate flange 40 is comprised of three straight segments 40a, 40b and 40c which are so arranged that a complete ring of hub segments will have the aligned intermediate walls defining a twenty-four sided polygon. The intermediate flange 40 defines the bottom of three attachment areas for thin sheet contactor media. The edges of the attachment areas are defined on one face of a segment 20 by an end partition 41 at the right edge 24 of the segment and two intermediate partitions 42 and 43 at the junctions of the straight segments 40a, 40b and 40c. Each of the partitions 41, 42 and 43 extend only part way up the face of the medial wall 21. There is no end partition at the left edge 23 of a segment because the right end partition 41 of the adjacent segment performs that function. On the opposite face of each segment 20, the attachment areas are defined by an end wall 44 at the right edge 24 and a pair of intermediate walls 45 and 46 disposed at the junction of the straight segments 40a, 40b and 40c of the intermediate flange 40. The walls 44, 45 and 46 are of greater height than the partitions 41, 42 and 43 on the opposite face, and extend nearly to the outer perimeter of the medial wall 21. A series of generally parallel stiffener portions 47 and 48 span the end and intermediate walls 44, 45 and 46 and are parallel with a respective straight section of the intermediate flange 40. The stiffener portions 47 and 48 generally extend from the medial wall 21 a distance less than the walls 44, 45 and 46.

Figure 2:
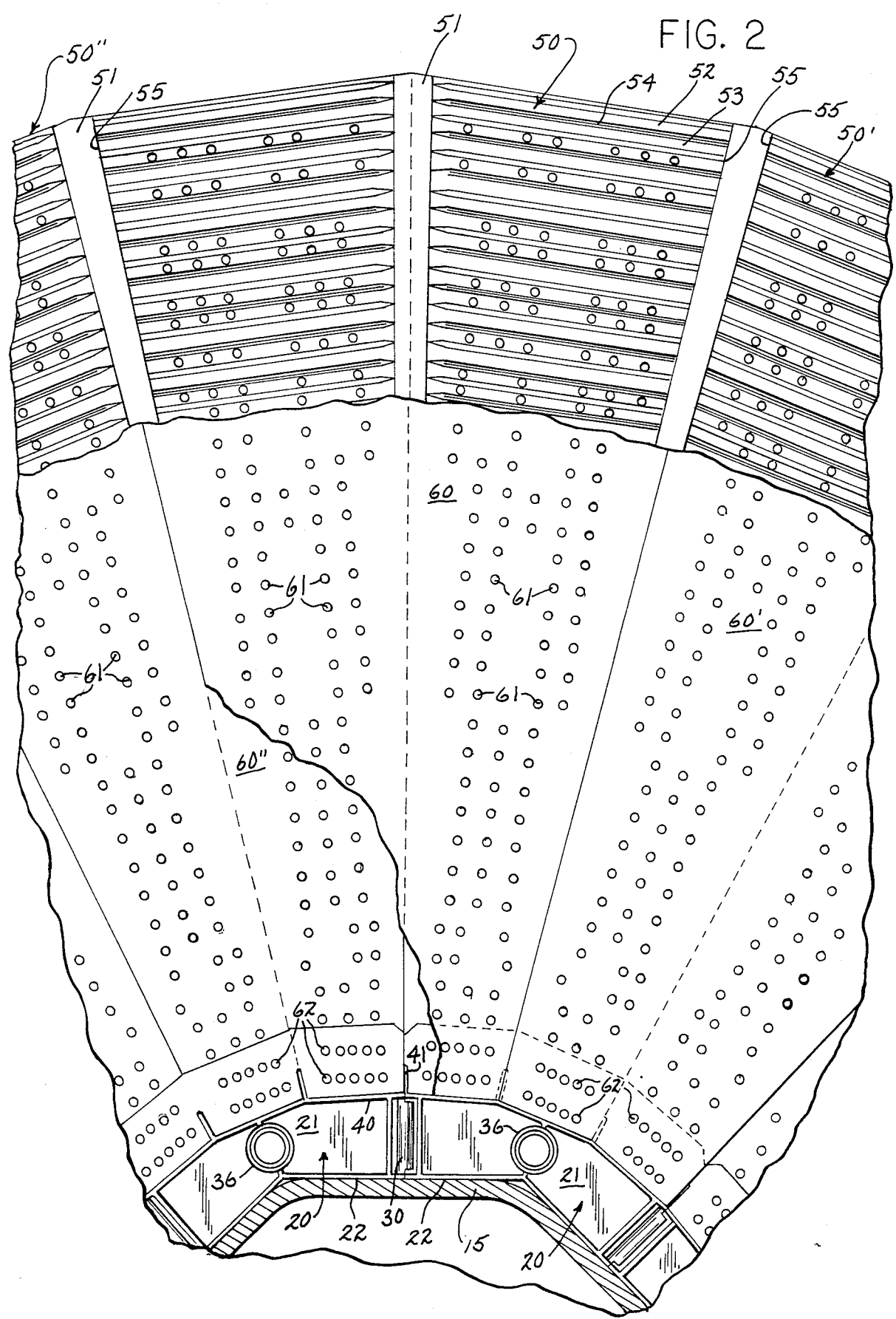
FIG. 2 is an enlarged front view in elevation and partially in section of a portion of the contactor of FIG. 1 with areas broken away for purposes of illustration.

A thin walled contactor media is built up from a series of formed and flat sector sheets which in the preferred embodiment each occupy a sector of about 30°. Referring to FIG. 2, the formed sector sheets 50 have a central radial flat wall portion 51 which is of increasing width in the direction of the perimeter of the formed sheet 50. The formed sheet 50 has a series of corrugations formed on either side of the central flat portion 51 and the corrugations define alternating peaks and valleys 52 and 53 connected by sloping side walls 54, as shown in FIG. 3. The corrugations are oriented tangentially to circles drawn at the axis of the contactor. The corrugations extend both above and below the plane of the central flat portions 51 and terminate at the radial edges 55 of the formed section 50. The arc described by each formed sector 50 is less than 30° so that the radial edges 55 of identical side by side sectors 50, 50' are spaced apart as shown in FIG. 2. The central flat portions 51 and the spaces between the adjacent formed sectors, such as the sectors 50, 50' both define radial passages for the entry of wastewater into the corrugations.

The formed sector sheets 50 are alternated with flat sector sheets 60 which span a sector of 30° and which complete the radial passages at the edges of the formed sectors 50 and at the flat central portions 51. Both the formed sectors 50 and flat sectors 60 are preferably formed from a thermoplastic resin such as polyethylene. The sectors are formed from thin sheet material having a thickness in the range of 0.02 to 0.03 inches. The formed sectors 50 are given their configuration by vacuum forming. In the preferred embodiment the sectors are joined to each other by welding using heated needles or pins which melt the material and fuse together the adjacent layers of the flat and formed sectors.

The innermost ends of both the formed sectors 50 and the flat sectors 60 are disposed within the mounting areas of the hub segments, as shown in FIG. 2. The formed and flat sectors 50 and 60, respectively, are notched to receive the partitions and walls as shown in FIG. 2. Also as shown in FIG. 3, the formed sectors 50 are preferably arranged back to back with respect to the flat sectors 60. A plurality of welds 61 join together the sectors 50 and 60 at their points of contact. The sectors 50 and 60 are similarly joined by welds 62 to the mounting portions of the hub segments 20.

The sectors 50 and 60 of successive layers are angularly offset with respect to each other. That is, as shown in FIG. 2, the formed sector 50 and flat sector 60 of one layer is offset by 15° from the formed sector 50' and flat sector 60' of the next layer. As a result, there are sectors which span the joints between adjacent hub segments 20. By welding the sectors 50 and 60 to each other and to the hub segments and by offsetting the layers of sectors, an assembly of hub and contactor media results which is an integral whole and which is self supporting.

Although the welded assembly of contactor media and hub rings is self-supporting, further strength and rigidity may be provided by inserting through rods into the long bore defined by the registering open centers of the bosses 6 of side by side hub segments 20.

Figure 7:
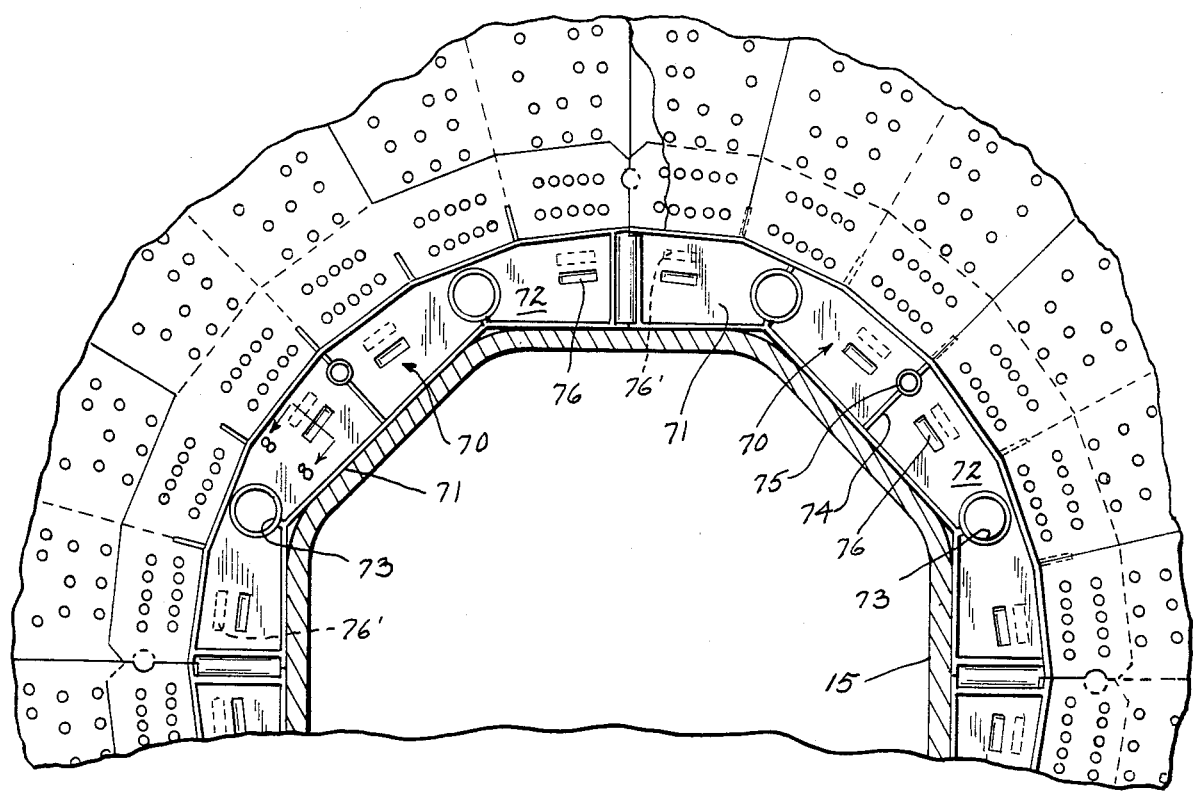
FIG. 7 is a partial enlarged front view in elevation of a portion of a second embodiment of a contactor in accordance with the invention.

In a second embodiment of the invention, the hub segments have an inner profile which complements two corners of the polygonal shaft. Referring to FIG. 7, the hub segments 70 are similar to the hub segments of the first embodiment but they are sized so as to circumscribe one quarter of the periphery of the octagonal shaft 15. The hub segments 70 each have an inner flange 71 and a medial wall 72 rising from the flange 71. The hub segments 70 are each provided with a series of posts at one end and a series of openings at the opposite end so that the ends of peripherally adjacent hub segments can be joined to each other in a manner identical with the hubs of the first embodiment. Furthermore, the hub segments 70 are provided with cylindrical bosses 73 which, as in the first embodiment, nest with similar bosses of a longitudinally adjacent segment to register therewith.

The segments 70 have an intermediate partition 74 extending normal to the inner flange 71 at a point midway between the pair of circular bosses 73. The intermediate partition 74 is interrupted by a small diameter circular boss 75.

Figure 8:
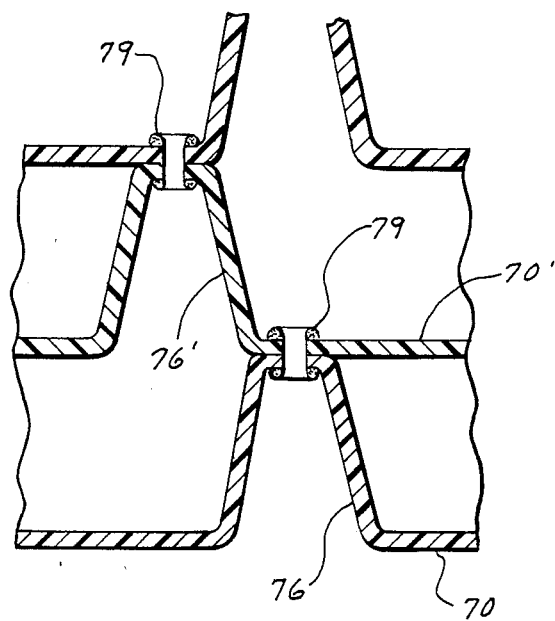
FIG. 8 is a view in section taken in the plane of the line 8—8 of FIG. 7.

A series of rectangular projections 76 are molded into each of the flat medial walls 72 of the segments 70. The projections 76 are of a depth sufficient to span the distance between the medial walls 72 of longitudinally adjacent segments. As illustrated in dotted lines in FIG. 7 and as shown in section in FIG. 8, a segment 70 with its rectangular projection 76 has a longitudinally adjacent segment 70' with a projection 76' which is radially offset from that of the projection 76 of the segment 70. The purpose of the radial offset of the projections 76 and 76' is to allow the projections 76 and 76' to contact a solid wall surface of the adjacent segment and to be welded thereto by welds 79. The overall effect is to provide a solid hub assembly which is welded together both circumferentially and longitudinally relative to the shaft.

The hub of the second embodiment may have media sectors welded to them which are identical to those of the first embodiment.

With both embodiments, the media sectors and hub segments can be welded together into large subassemblies in a factory and transported to the field for installation at the point of use. Thus, with both embodiments, lengths of welded hub segments and media sectors can be joined into 180° sections in a factory. The sections can be transported separate from the shaft to which they will be joined and assembled about the shaft in the field by welding them together. Greater strength is obtained by staggering longitudinally adjacent built-up sections by 90° so that they overlap along the length of the shaft. This approach not only simplifies transportation of the contactor but also allows shafts to be assembled in buildings or in areas where cranes cannot be utilized. Contactor diameters in excess of five meters can be satisfactorily manufactured using the present invention all without the use of any supporting superstructure.

Embodiments utilizing hub segments which complement one and two corners of a polygonal shaft have been disclosed. However, the invention contemplates the use of hub segments which complement any number of corners of a polygonal shaft, depending upon the number of corners of a shaft. The only limitation is that the individual hub segments do not circumscribe more than half of the perimeter of the polygonal shaft.

In the typical use of a rotating biological contactor in accordance with the present invention, the contactors 10 will be mechanically driven by connecting a motor drive to one of the stub shafts 16. However, a contactor utilizing the concepts of this invention may also be rotated by the use of an air drive. That is, air cups may be arranged about the outer perimeter of the contactor media to trap bubbles of air which are released beneath the surface of the wastewater in the tank, in the manner of the air driven rotating biological contactor shown and described in U.S. Pat. No. 3,886,074 issued May 27, 1975 to Prosser.

A rotating biological contactor in accordance with this invention provides a strong but lightweight, self-supporting contactor structure having a high surface area for the growth of the biomass. It allows the use of a large central steel shaft which is totally surrounded by a hub structure of relatively heavy section and built up from identical or nearly identical hub segments which can be formed in multiple cavity injection molds using a biological inert plastic resin.

I claim:
1. A rotating biological contactor comprising:

a polygonal shaft;

a plurality of adjacent polymeric hub rings disposed side by side and surrounding said shaft, each of said hub rings comprising a plurality of identical hub segments joined end to end by welding and each hub segment having an inner profile which complements the contour of the shaft and a mounting portion extending radially outwardly of each of said hub rings;

each of said hub segments further having a wall extending in a plane normal to the axis of the shaft, and a projection extending from the wall of each hub segment and welded to the wall of a hub segment of an adjacent hub ring;

polymeric contactor media welded to said mounting portion of each of said hub segments about the perimeter of each of said hub rings, and the contactor media of each hub ring being welded to the contactor media of an adjacent hub ring to form an integrated unit, said contactor media defining a series of passageways through which wastewater to be treated can pass.

2. A rotating biological contactor in accordance with claim 1 wherein said contactor media includes thin walled formed and flat sheets, and said hub segments and said sheets are each formed of a plastic resin material.

3. A rotating biological contactor in accordance with claim 1 wherein each hub segment has a first joint portion at one end which includes a plurality of openings and a second joint portion at its opposite end which includes a plurality of posts adapted to be received in the openings of the first joint portion of an adjacent hub segment.

4. A rotating biological contactor in accordance with claim 3 wherein said openings and posts are each aligned along lines perpendicular to the inner profile of the hub segment.

5. A rotating biological contactor in accordance with claim 4 wherein said openings are disposed within a recess in said first joint portion and wherein said posts are disposed on a platform projecting from said second joint portion, said platform having a shape which mates with the shape of said recess.

6. A rotating biological contactor in accordance with claim 1 wherein said inner profile of each hub segment complements one corner of said shaft.

7. A rotating biological contactor in accordance with claim 1 wherein said inner profile of each hub segment complements more than one corner of said shaft.

* * * * *